US009037853B2

(12) United States Patent
Rozek et al.

(10) Patent No.: US 9,037,853 B2
(45) Date of Patent: May 19, 2015

(54) COMMUNICATION METHOD FOR MULTISUBSCRIBER NETWORKS, WHICH IS PROTECTED FROM DECEPTION, EAVESDROPPING AND HACKING

(75) Inventors: Werner Rozek, Floh-Seligenthal (DE);
Thomas Rozek, Floh-Seligenthal (DE);
Jan Rozek, Floh-Seligenthal (DE)

(73) Assignee: Fachhochschule Schmalkalden, Schmalkalden (DE)

( * ) Notice: Subject to any disclaimer, the term of this patent is extended or adjusted under 35 U.S.C. 154(b) by 1090 days.

(21) Appl. No.: 12/918,557

(22) PCT Filed: Nov. 17, 2008

(86) PCT No.: PCT/EP2008/065658
§ 371 (c)(1),
(2), (4) Date: Nov. 11, 2010

(87) PCT Pub. No.: WO2009/103365
PCT Pub. Date: Aug. 27, 2009

(65) Prior Publication Data
US 2011/0047375 A1   Feb. 24, 2011

(30) Foreign Application Priority Data

Feb. 22, 2008   (DE) .................... 10 2008 010 794

(51) Int. Cl.
*H04L 29/06*   (2006.01)
*H04L 9/32*    (2006.01)

(52) U.S. Cl.
CPC .......... *H04L 9/3236* (2013.01); *H04L 63/0428* (2013.01); *H04L 63/068* (2013.01); *H04L 63/123* (2013.01); *H04L 2209/80* (2013.01)

(58) Field of Classification Search
USPC ................................................. 713/150, 161
See application file for complete search history.

(56) References Cited

U.S. PATENT DOCUMENTS 4,322,577 A * 3/1982 Brandstrom ..................... 380/37
6,282,496 B1 * 8/2001 Chowdhary .................. 701/446
(Continued)

FOREIGN PATENT DOCUMENTS

DE   10043310 A1   3/2001
DE   10043313 A1   3/2001
(Continued)

OTHER PUBLICATIONS

A. Menezes, P. Van Oorschot, S. Vanstone; "Chapter 9: Hash Functions and Data Integrity," Handbook of Applied Cryptography; Oct. 1, 1996, pp. 321-383, CRC Press, Boca Raton, Florida.
(Continued)

*Primary Examiner* — Hadi Armouche
*Assistant Examiner* — Hee Song
(74) *Attorney, Agent, or Firm* — Heslin Rothenberg Farley & Mesiti P.C.

(57) ABSTRACT

The invention relates to a P2P communication method for multi-subscriber networks, which is protected from deception, eavesdropping and hacking, and wherein the communication carried out in an interval is predominantly carried out in separate rooms, allocated to the P2P communication, and with separate reference data allocated to the P2P communication. At least part of the separate random reference data and/or random data is generated in at least one unit that participates in the P2P communication and is exchanged within the P2P communication in the form of relative data. The separate P2P communication is initiated with respect to at least one global random reference date valid for the time of the P2P communication, the random reference date being valid for a randomly determined time range and being stored in all units that carry out the P2P communications in a secret and non-deceivable manner.

10 Claims, 16 Drawing Sheets

(56) References Cited

U.S. PATENT DOCUMENTS

Figure 11:
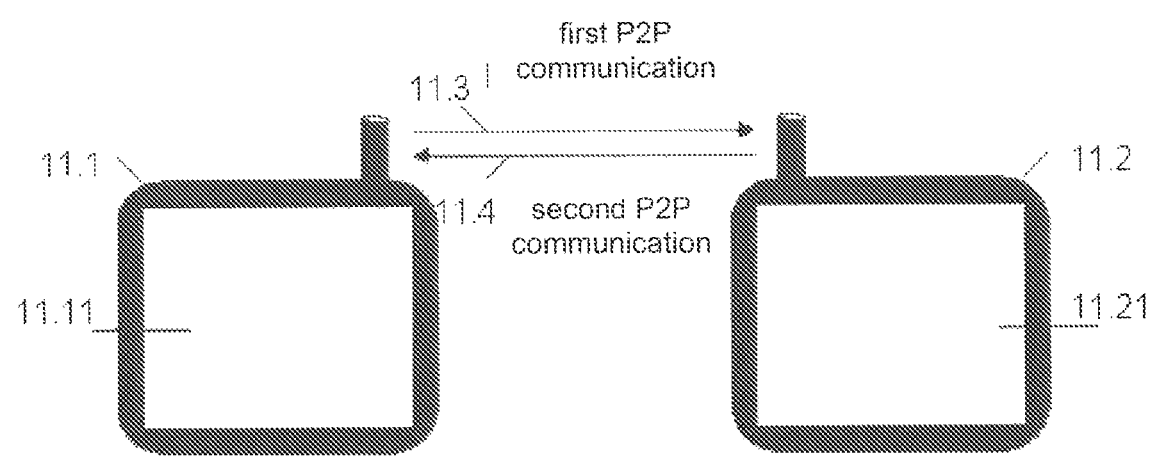

| | | | |
|---|---|---|---|
| 6,798,884 B1* | 9/2004 | Kasahara et al. | 380/28 |
| 2005/0075811 A1* | 4/2005 | Lafitte et al. | 702/70 |
| 2005/0114660 A1* | 5/2005 | Lee et al. | 713/166 |
| 2007/0273504 A1* | 11/2007 | Tran | 340/539.12 |
| 2008/0004904 A1* | 1/2008 | Tran | 705/2 |
| 2009/0316900 A1* | 12/2009 | Qiu et al. | 380/258 |

FOREIGN PATENT DOCUMENTS

| | | |
|---|---|---|
| DE | 10104307 A1 | 12/2001 |
| DE | 10222492 A1 | 11/2003 |

OTHER PUBLICATIONS

International Search Report for PCT/EP2008/065658 dated Jul. 28, 2009.

* cited by examiner

Fig. 1

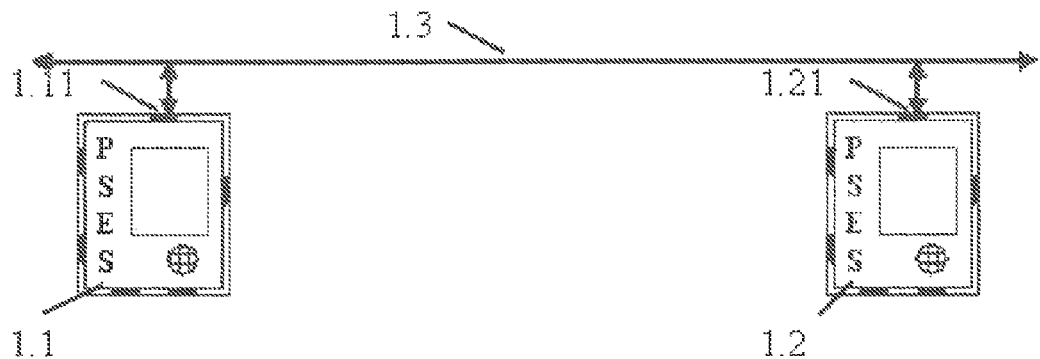

Fig. 2

Global random reference data element GZBiµ

| Bit number from GODiµ | Byte of GZBiµ | use | |
|---|---|---|---|
| 0-6 | (G)TBi_{1st byte} | calculation basis for the coordinate dimensions of GRi | |
| 7-13 | (G)TBi_{2nd byte} | | |
| 14-17 | (G)TBi_{3rd byte} | calculation basis for the coordinate dimensions of GARi | |
| 18-21 | (G)TBi_{4th byte} | | |
| 22,23 | (G)TBi_{5th byte} | | |
| 24,25 | (G)TBi_{6th byte} | calculation basis for the coordinate dimensions of GBRi and the position of GARi in GBRi | |
| 26,27 | (G)TBi_{7th byte} | | |
| 28,29 | (G)TBi_{8th byte} | | |
| 30-157 | (G)Z1i | global random number j (associated with GBRi) | |
| 158-285 | (G)Z2i | | |
| 286-1309 | (G)ZTi | global random transfer reference number in GRi | |
| 1310-1317 | (G)SB | start byte | byte interlacing information for GDA1i |
| 1318-1324 | (G)VB | number of linked bytes | |
| 1325-1333 | (G)AB | spacing of the byte packets | |

GRi    - global transfer space
GARi   - global address space
GBRi   - global reference space

Fig. 3

Separate random reference data element (SZBkiμ)

| Bit number from PODki | Byte of SZBiμ | use | |
|---|---|---|---|
| 0-6 | (S)TBi$_{1st\ byte}$ | calculation basis for the coordinate dimensions of SRki | |
| 7-13 | (S)TBi$_{2nd\ byte}$ | | |
| 14-17 | (S)TBi$_{3rd\ byte}$ | calculation basis for the coordinate dimensions of SARki | |
| 18-21 | (S)TBi$_{4th\ byte}$ | | |
| 22,23 | (S)TBi$_{5th\ byte}$ | | |
| 24,25 | (S)TBi$_{6th\ byte}$ | calculation basis for the coordinate dimensions of SBRki and the position of SARki in SBRki | |
| 26,27 | (S)TBi$_{7th\ byte}$ | | |
| 28,29 | (S)TBi$_{8th\ byte}$ | | |
| 30-157 | (S)Z1kj | separate random number j (associated with SBRki) | |
| 158-285 | (S)Z2kj | | |
| 286-1309 | (S)ZTkj | separate random transfer reference number in SRki | |
| 1310-1317 | (S)SB | start byte | byte interlacing information for SDA1ki |
| 1318-1324 | (S)VB | number of linked bytes | |
| 1325-1333 | (S)AB | spacing of the byte packets | |

SRki     - separate transfer space
SARki    - separate address space
SBRki    - separate reference space Fig. 4A
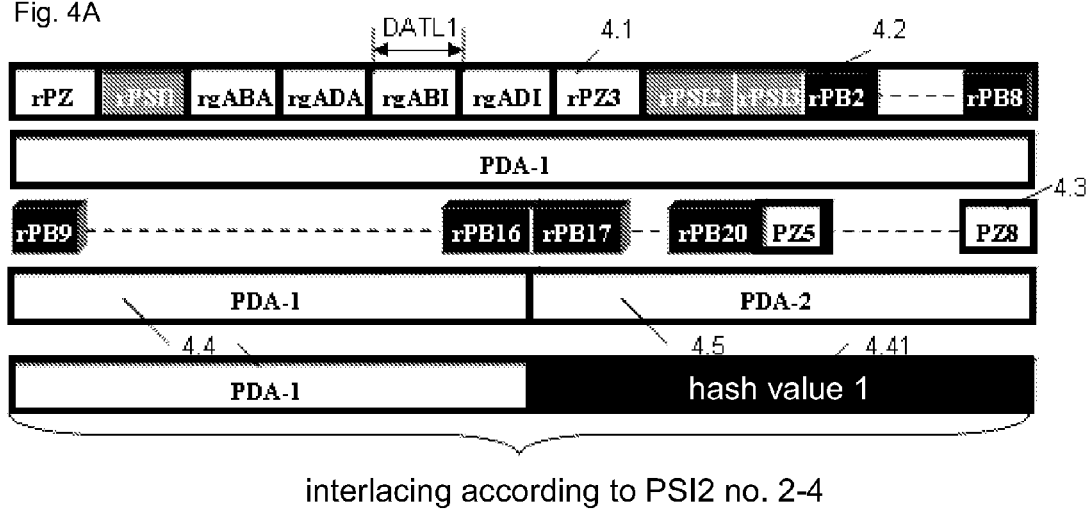
interlacing according to PSI2 no. 2-4
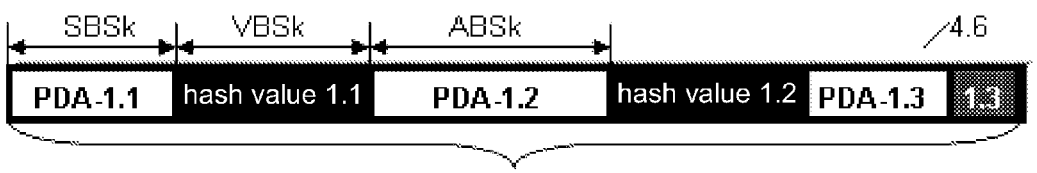
packing into P2P data blocks of data length DATL2
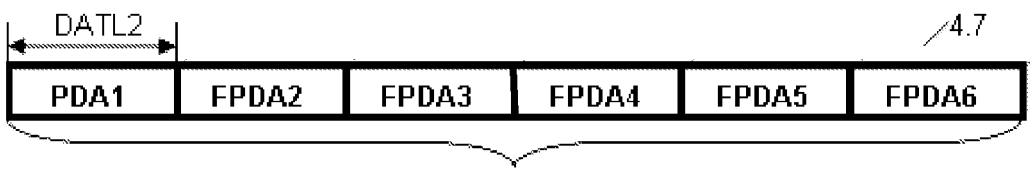
determining relative data with data length DATL2
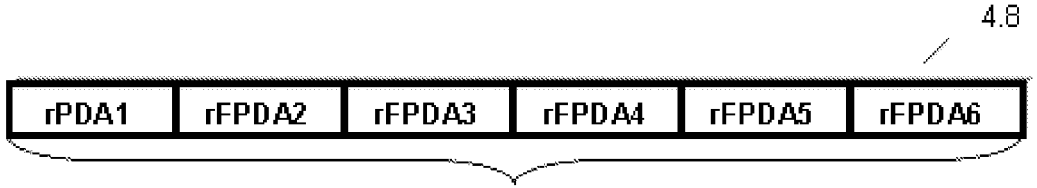
interlacing of rPDA1 partial data into FPDAj data
\*
\*
\*

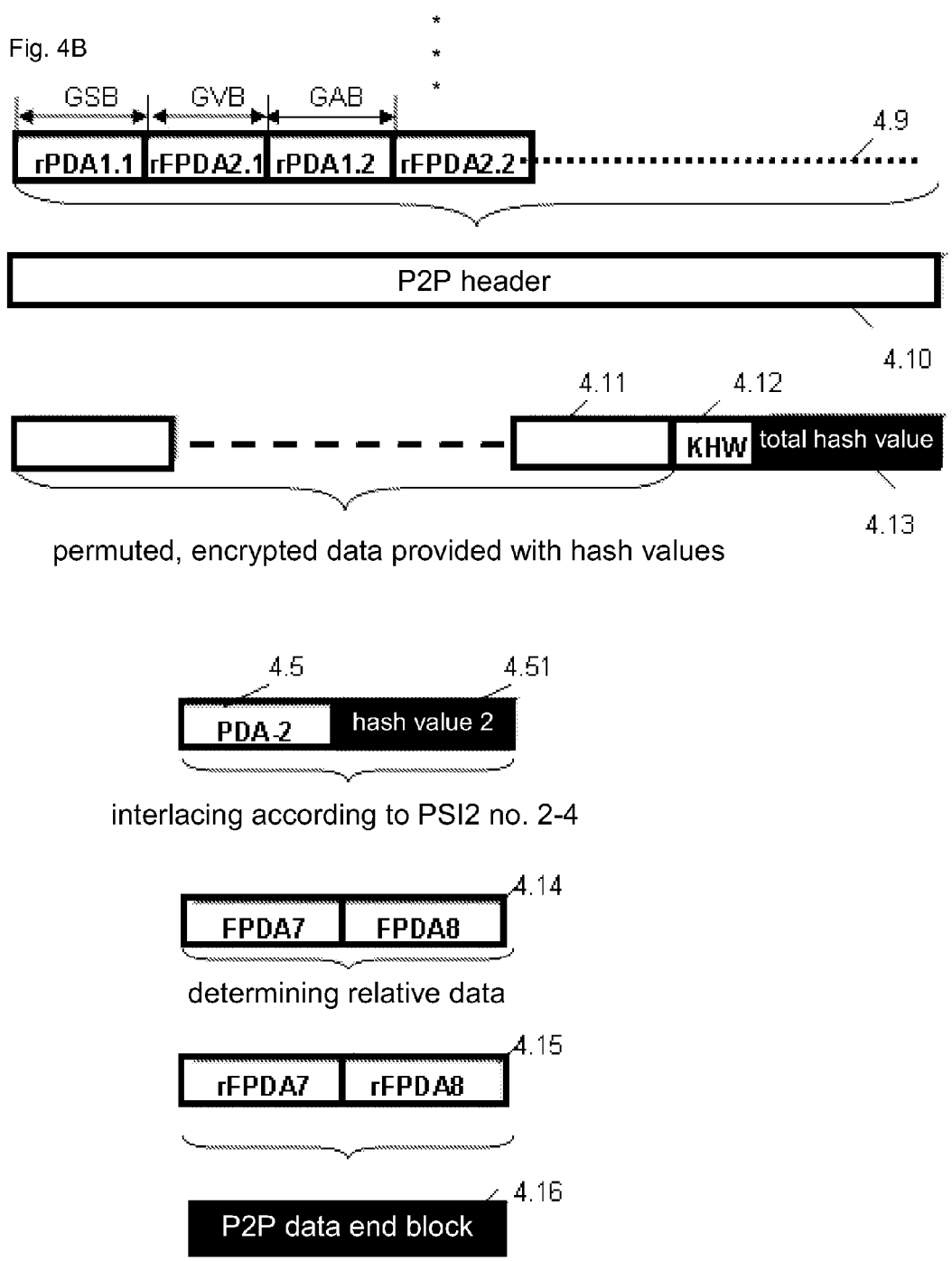

Fig. 4C

P2P control information PSI1k

| No. | meaning | abbr. | byte |
|---|---|---|---|
| 1 | • SID bit position data element | SODkiμ | 2 |
| 2 | • time stamp of card transmission (12 bits - year, 4 bits -month, 5 bits -day, 5 bits - hour, 6 bits - minute) | ZdKSk | 5 |
| 3 | • time indication of P2P transmission with reference to No. 2 | ZdPSk | 2 |
| 4 | • predefined time of return transmission ($\hat{=}$ time interval to receive time) | ZdRSk | 3 |
| 5 | • distance number | ANUiμ | 2 |
| 6 | • distance number (duplicate) | ANUiμ | 2 |

P2P control information PSI2k

| No. | meaning | abbr. | byte |
|---|---|---|---|
| 1 | • P2P control word | PSW | 6 |
|   | • byte interlacing information for PDA check sum |   |   |
| 2 | •• start byte | SBSk | 1 |
| 3 | •• number of concatenated bytes | VBSk | 1 |
| 4 | •• spacing of the byte packets | ABSk | 1 |
| 5 | • bit position data element | PODkiμ | 2 |
| 6 | • separate P2P transfer space | SPRk | 2 |
| 7 | • separate P2P reference space/ PUAR | SPBRk | 1 |
| 8 | • separate P2P address space | SPARk | 1 |
| 9 | • separate P2P address space (duplicate) | SPARk | 1 |

P2P control information PSI3k

| No. | meaning | abbr. | byte |
|---|---|---|---|
| 1 | • P2P data component word | PBW | 2 |
|   | • byte interlacing information for interlacing data |   |   |
| 2 | •• start byte | SDFk | 1 |
| 3 | •• number of concatenated bytes | BZDk | 1 |
| 4 | •• byte spacing of the byte packets | BADk | 1 |
| 5 | • encryption type | VSAk | 1 |
| 6 | • data key length word | DSLk | 4 |
| 7 | • data key repetition | DSWk | 1 |
| 8 | • permutation word | PERMk | 3 |
| 9 | • data packet length | DPLk | 1 |
| 10 | • data packet length (duplicate) | DPLk | 1 |

Fig. 4D

P2P data component word PBW
(corresponds to component identification data element)

| j | bit | state | | | meaning | | j | bit | state | | | meaning | |
|---|---|---|---|---|---|---|---|---|---|---|---|---|---|
| 2 | 0 | = 1 / = 0 | ≙ / ≙ | | $GPS_1$ | active / inactive | 13-16 | 8 | = 1 / = 0 | ≙ / ≙ | | PI | active / inactive |
| 3 | 1 | = 1 / = 0 | ≙ / ≙ | | $GPS_2$ | active / inactive | 17-20 | 9 | = 1 / = 0 | ≙ / ≙ | | $SUS_1$ | active / inactive |
| 4 | 2 | = 1 / = 0 | ≙ / ≙ | | $PGNR_1$ | active / inactive | 21 | 10 | = 1 / = 0 | ≙ / ≙ | | SKTN | active / inactive |
| 5 | 3 | = 1 / = 0 | ≙ / ≙ | | $SKN_1$ | active / inactive | 22 | 11 | = 1 / = 0 | ≙ / ≙ | | SOZ/STN | active / inactive |
| 6 | 4 | = 1 / = 0 | ≙ / ≙ | | $SKG_1$ | active / inactive | 23 | 12 | = 1 / = 0 | ≙ / ≙ | | SSR | active / inactive |
| 7 | 5 | = 1 / = 0 | ≙ / ≙ | | $PGNR_2$ | active / inactive | 24 | 13 | = 1 / = 0 | ≙ / ≙ | | KENU | active / inactive |
| 8 | 6 | = 1 / = 0 | ≙ / ≙ | | $SKN_2$ | active / inactive | | 14 | = 1 / = 0 | ≙ / ≙ | | data portion present | active / inactive |
| 9-12 | 7 | = 1 / = 0 | ≙ / ≙ | | PI | active / inactive | | 15 | = 1 / = 0 | ≙ / ≙ | | interlacing data in data portion | active / inactive |

$GPS_i$   - coordinates of the transmitting unit (i=1) and receiving unit (i=2)
$PGNR_i$ - PSES device number, with transmitting unit (i=1) and receiving unit (i=2)
$SKN_i$   - SID card number, with sender card (i=1) and recipient card (i=2)
$SKG_i$   - SID card validity data element of the sender card (i=1)
PI      - permutation data element
$SUS_1$  - signature data of the sender (i=1) stored in SID card
SKTN  - selected account number stored in SID card
SOZ   - social insurance number stored in SID card
STN   - tax number stored in SID card
SSR   - SID card status register
KENU - identity number, e.g. for indentifying the originator

Fig. 5

Calculation of spatial coordinates from GZBiµ or SZBiµ

Determination of spatial coordinates: transfer space $TBi_{1st\ byte} < 126 \rightarrow Mask = 0x7F \quad else \quad Mask = 0x3F\}$
$TRxi = Mask\ \&\ TBi_{1st\ byte} + 1$
$TRi_{remainder} = 127 - TRxi$
$Mask = 0x00$
$(0x01\ \&\ TBi_{2nd\ byte} < TRi_{remainder} \rightarrow Mask = 0x01$
$(0x03\ \&\ TBi_{2nd\ byte} < TRi_{remainder} \rightarrow Mask = 0x03$
$(0x07\ \&\ TBi_{2nd\ byte} < TRi_{remainder} \rightarrow Mask = 0x07$
$(0x0F\ \&\ TBi_{2nd\ byte} < TRi_{remainder} \rightarrow Mask = 0x0F\}$
$TRyi = Mask\ \&\ TBi_{2nd\ byte} + 1$
$TRzi = 128 - (TRxi + TRyi)$ (Equ.5-1)

Determination of spatial coordinates: address space $TBi_{3rd\ byte} < 10 \rightarrow Mask = 0x0F \quad else \quad Mask = 0x7\}$
$ARxi = Mask\ \&\ TBi_{3rd\ byte} + 1$
$ARi_{remainder} = 11 - ARxi;\ Mask = 0x00$
$(0x01\ \&\ TBi_{4th\ byte} < ARi_{remainder} \rightarrow Mask = 0x01$
$(0x03\ \&\ TBi_{4th\ byte} < ARi_{remainder} \rightarrow Mask = 0x03$
$(0x07\ \&\ TBi4th\ byte < ARi_{remainder} \rightarrow Mask = 0x07$
$(0x0F\ \&\ TBi4th\ byte < ARi_{remainder} \rightarrow Mask = 0x0F\}$
$ARyi = Mask\ \&\ TBi_{4th\ byte} + 1$
$ARzi = 12 - (ARxi + ARyi)$ (Equ.5-2)

Determination of spatial coordinates: reference space $UARxi = TBi_{5th\ byte};\ Sum = UARxi + TBi_{6th\ byte}$
$Sum > 3 \rightarrow Sum = 4;\quad BRxi = Sum + ARxi$
$UARyi = TBi_{7th\ byte};\ Sum = UARyi + TBi_{8th\ byte}$
$Sum > 3 \rightarrow Sum = 4;\quad BRyi = Sum + ARyi$
$BRzi = 16 - (BRxi + BRyi)$
$UARzi = BRzi - ARzi$ (Equ.5-3)

Fig. 6

Generation and addition of random components to PSI2 and PSI3

```
Mask1   = 0xFFFFFFFFFFFF 0x01 0x00 0x00 0x0000 0x0000 0x00 0x00 0x00
PZ1k    = Mask1 ∨ PZ1k
PSI2k   = PSW 0xFF 0xFF 0xFF 0xFFFF 0xFFFF 0xFF 0xFF 0xFF              (Equ. 6-1)
PSI2k   = PSI2 & PZ1k → copy höchstes byte of PSI2 auf nächst niedriges Byte
ZWV     = 1 →
{Mask2  = 0xFFFF 0x00 0x00 0x00 0x00 0x00000000 0x00 0xFFFFFF 0xFF 0xFF
PZ2k    = Mask2 ∨ PZ2k
PSI3k   = PBW 0xFF 0xFF 0xFF VSA 0xFFFFFFFF 0xFF PERM DPL DPL }
ZWV     = 0 →
{Mask3  = 0xFFFF 0x00 0x00 0x00 0xFF 0x00000000 0x00 0xFFFFFF 0xFF 0xFF
PZ2k    = Mask3 ∨ PZ2k
PSI3k   = PBW 0xFF 0xFF 0xFF VSA 0xFFFFFFFF 0xFF PERM DPL DPL }
PSI3k   = PSI3k & PZ2k
```

Fig. 7A $$\{\overrightarrow{position\ vector1} - [\overrightarrow{position\ vector2}]\} - \overrightarrow{TR} = \overrightarrow{rdatum} \rightarrow \overrightarrow{rdatum}^T = rdatum$$

$\overrightarrow{PZki} = PZ4k, \quad \overrightarrow{GPZi} = GPZ1i, \quad \overrightarrow{GPTRi} = GPZ2i$ (Equ.7-1)

$\{\overrightarrow{PZki} - [\overrightarrow{GPZi}]\} - \overrightarrow{GPTRi1} = \overrightarrow{rPZki} \quad \rightarrow rPZ$ $\{\overrightarrow{PSI1ki} - [\overrightarrow{PZki} \oplus \overrightarrow{GPZi2}]\} - \overrightarrow{GPTRi2} = \overrightarrow{rPSI1ki} \quad \rightarrow rPSI1$ $\{\overrightarrow{gABAki} - [\overrightarrow{PZki} \oplus \overrightarrow{GPZi3}]\} - \overrightarrow{GPTRi3} = \overrightarrow{rgABAki} \quad \rightarrow rgABA$ $\overrightarrow{GPZi} = GPZ2i, \quad \overrightarrow{GPTRi} = GPZ1i,$ $\{\overrightarrow{gADAki} - [\overrightarrow{gABAki} \oplus \overrightarrow{PZki1}]\} - \overrightarrow{GPTRi1} = \overrightarrow{rgADAki} \quad \rightarrow rgADA$ $\{\overrightarrow{gABIki} - [\overrightarrow{gADAki} \oplus \overrightarrow{PZki2}]\} - \overrightarrow{GPTRi2} = \overrightarrow{rgABIki} \quad \rightarrow rgABI$ $\{\overrightarrow{gADIki} - [\overrightarrow{gABIki} \oplus \overrightarrow{PZki3}]\} - \overrightarrow{GPTRi3} = \overrightarrow{rgADIki} \quad \rightarrow rgADI$ $\{\overrightarrow{PZ3ki} - [\overrightarrow{GPZi} \oplus \overrightarrow{PZki4}]\} - \overrightarrow{GPTRi4} = \overrightarrow{rPZ3ki} \quad \rightarrow rPZ3$ $\{\overrightarrow{PSI2ki} - [\overrightarrow{PZ3ki} \oplus \overrightarrow{GPZi5}]\} - \overrightarrow{GPTRi5} = \overrightarrow{rPSI2ki} \quad \rightarrow rPSI2$ $$\{\overrightarrow{position\ vector1} - [\overrightarrow{position\ vector2}]\} - \overrightarrow{TR} = \overrightarrow{rdatum} \rightarrow \overrightarrow{rdatum}^T = rdatum$$

$\overrightarrow{PZki} = PZ3k \quad \overrightarrow{PTRki} = PZ4k, \overrightarrow{SPZki} = SPZ1ki$ (Equ.7-2)

$\{\overrightarrow{PSI3ki} - [\overrightarrow{PZki} \oplus \overrightarrow{SPZki1}]\} - \overrightarrow{PTRki1} = \overrightarrow{rPSI3ki} \quad \rightarrow rPSI3$ $\{\overrightarrow{PBjki} - [\overrightarrow{PZki} \oplus \overrightarrow{SPZkij}]\} - \overrightarrow{PTRkij} = \overrightarrow{rPBjki} \quad \rightarrow rPBj$ $$\{\overrightarrow{position\ vector1} - [\overrightarrow{position\ vector2}]\} - \overrightarrow{TR} = \overrightarrow{rdatum} \rightarrow \overrightarrow{rdatum}^T = rdatum$$

$\overrightarrow{GPZTi} = GPZTi, \quad \overrightarrow{GPTRi} = GPZ2i$ (Equ.7-3)

$\{\overrightarrow{PDA1ki} - [\overrightarrow{GPZTi}]\} - \overrightarrow{GPTRi4} = \overrightarrow{rPDA1ki} \quad \rightarrow rPDA1$ $\overrightarrow{PZki} = PZ4k, \quad \overrightarrow{SPZTki} = SPZTki, \quad \overrightarrow{PTRki} = PZ3k$ (Equ.7-4)

$\{\overrightarrow{FPDA2ki} - [\overrightarrow{SPZTki} \oplus \overrightarrow{PZki2}]\} - \overrightarrow{PTRki2} = \overrightarrow{rFPDA2ki} \rightarrow rFPDA2$ $\{\overrightarrow{FPDA3ki} - [\overrightarrow{SPZTki} \oplus \overrightarrow{PZki3}]\} - \overrightarrow{PTRki3} = \overrightarrow{rFPDA3ki} \rightarrow rFPDA3$ $\{\overrightarrow{FPDA4ki} - [\overrightarrow{SPZTki} \oplus \overrightarrow{PZki4}]\} - \overrightarrow{PTRki4} = \overrightarrow{rFPDA4ki} \rightarrow rFPDA4$ $\{\overrightarrow{FPDA5ki} - [\overrightarrow{SPZTki} \oplus \overrightarrow{PZki5}]\} - \overrightarrow{PTRki5} = \overrightarrow{rFPDA5ki} \rightarrow rFPDA5$ $\{\overrightarrow{FPDA6ki} - [\overrightarrow{SPZTki} \oplus \overrightarrow{PZki6}]\} - \overrightarrow{PTRki6} = \overrightarrow{rFPDA6ki} \rightarrow rFPDA6$ $\{\overrightarrow{FPDA7ki} - [\overrightarrow{SPZTki} \oplus \overrightarrow{PZki7}]\} - \overrightarrow{PTRki7} = \overrightarrow{rFPDA7ki} \rightarrow rFPDA7$ $\{\overrightarrow{FPDA8ki} - [\overrightarrow{SPZTki} \oplus \overrightarrow{PZki8}\} - \overrightarrow{PTRki8} = \overrightarrow{rFPDA8ki} \rightarrow rFPDA8$

Fig. 7B

Equations (equ.7-1) → Calculations in global P2P reference space GPBRi
Dimension of the space: GPBRxi + GPBRyi + GPBRzi = 128 bits

| name | dimension | | | meaning | |
|---|---|---|---|---|---|
| | x | y | z | | |
| PZ4k | 128 bits | | | random number 4 (binary number) communication related | |
| GPZ1i | 128 bits | | | random reference data element (binary number) | |
| GPZ2i | 128 bits | | | random reference data element (binary number) | |
| $\overline{PZki}$ | GPBRxi | GPBRyi | GPBRzi | random number (binary number) | interpreted as a position vector |
| $\overline{GPZi}$ | GPBRxi | GPBRyi | GPBRzi | random reference data element | |
| $\overline{PSI1ki}$ | GPBRxi | GPBRyi | GPBRzi | PSI1k | |
| $\overline{gABAki}$ | GPBRxi | GPBRyi | GPBRzi | secret sender address | |
| $\overline{gADAki}$ | GPBRxi | GPBRyi | GPBRzi | secret recipient address | |
| $\overline{gABIki}$ | GPBRxi | GPBRyi | GPBRzi | secret sender identity | |
| $\overline{gADIki}$ | GPBRxi | GPBRyi | GPBRzi | secret recipient identity | |
| $\overline{PZ3ki}$ | GPBRxi | GPBRyi | GPBRzi | random number | interpreted as a position vector |
| $\overline{PSI2ki}$ | GPBRxi | GPBRyi | GPBRzi | PSI2k | |
| $\overline{PZki}\,j$ | 1 byte | 1 byte | 1 byte | partial vectors formed from bytes [(3j-2),(3j-1),(3j)] of the respective random number or respective random reference data element | |
| $\overline{GPZi}\,j$ | 1 byte | 1 byte | 1 byte | | |
| $\overline{GPTRi}\,j$ | 1 byte | 1 byte | 1 byte | | |

Equations (equ.7-2) → calculations in separate P2P reference space SPBRki
Dimension of the space: SPBRxki + SPBRyki + SPBRzki = 128 bits

| name | dimension | | | meaning | |
|---|---|---|---|---|---|
| | x | y | z | | |
| PZ3k | 128 bits | | | random number 3 (binary number) communication related | |
| PZ4k | 128 bits | | | random number 4 (binary number) communication related | |
| SPZ1ki | 128 bits | | | random reference data element (binary number) | |
| $\overline{PTRki}$ | $\overrightarrow{PTRki\,1}...\overrightarrow{PTRki\,j}$ | | | see Fig. 10 | |
| $\overline{PSI3ki}$ | SPBRxi | SPBRyi | SPBRzi | PSI3k | interpreted as a position vector |
| $\overrightarrow{PBjki}$ | SPBRxi | SPBRyi | SPBRzi | PBjk | |
| $\overline{PZki}\,j$ | 1 byte | 1 byte | 1 byte | partial vectors formed from every 3 bytes of the respective random number or random reference data element (see Fig. 10) | |
| $\overline{PTRki}\,j$ | 1 byte | 1 byte | 1 byte | | |
| $\overline{SPZki}\,j$ | 1 byte | 1 byte | 1 byte | | |

Fig. 7C

Equations (equ.7-3) → Calculations in global P2P transfer space GPRi
Dimension of the space: GPRxi + GPRyi + GPRzi = 1024 bits

| name | dimension | | | meaning |
|---|---|---|---|---|
| | x | y | z | |
| GPZ2i | 128 bits | | | global random reference number (binary number) |
| GPZTi | 1024 bits | | | global random transfer reference number (binary number) |
| $\overrightarrow{GPZTi}$ | GPRxi | GPRyi | GPRzi | position vector of global random transfer reference number (binary number) |
| $\overrightarrow{PDA1ki}$ | GPRxi | GPRyi | GPRzi | position vector of PDA1 (binary number) |
| $\overrightarrow{GPTRi}$ 4 | 1 byte | 1 byte | 1 byte | partial vectors formed from byte [10., 11.,12] of random reference data element GPZ2j |

ZuFL1 = length of vector $\overrightarrow{GPZTi}$ = 1024 bits

ZuFL1 = length of vector $\overrightarrow{PDA1ki}$ = 1024 bits

ZuFL3 = length of vector $\overrightarrow{GPTRi}$ 4 = 24 bits

Equations (equ. 7-4) → calculations in separate P2P transfer space SPRki
Dimension of the space: SPRxki + SPRyki + SPRzki = 1024 bits

| name | dimension | | | meaning |
|---|---|---|---|---|
| | x | y | z | |
| PZ3k | 128 bits | | | random number 3 (binary number) communication related |
| PZ4k | 128 bits | | | random number 4 (binary number) communication related |
| SPZTki | 1024 bits | | | separate random reference data element (binary number) |
| $\overrightarrow{SPZTki}$ | SPRxki | SPRyki | SPRzki | position vector of separate random transfer reference number (binary number) |
| $\overrightarrow{PTRki}$ j | 1 byte | 1 byte | 1 byte | partial vectors formed from bytes [(3j-2),(3j-1),(3j)] of the respective random number |
| $\overrightarrow{PZKk}$ j | 1 byte | 1 byte | 1 byte | |

ZuFL1 = length of vector $\overrightarrow{SPZTki}$ = 1024 bits

ZuFL2 = length of vector $\overrightarrow{PZKk}$ = 24 bits

ZuFL3 = length of vector $\overrightarrow{PTRki}$ = 24 bits

Fig. 8A $$\overrightarrow{rdatum} = \overrightarrow{rdatum}^T \rightarrow \{\overrightarrow{rdatum} + \overrightarrow{TR} + [\overrightarrow{position\ vector 2}]\} = \overrightarrow{position\ vector 1}$$

$\overrightarrow{GPZTi} = GPZTi, \quad \overrightarrow{GPTRi} = GPZ2i$ (Equ.8-1)

$\{\overrightarrow{rPDA1} + \overrightarrow{GPTRi4} + [\overrightarrow{GPZTi}]\} = \overrightarrow{PDA1ki} \rightarrow PDA1k$ $\overrightarrow{GPZi} = GPZ1i, \quad \overrightarrow{GPTRi} = GPZ2i$ (Equ.8-2)

$\{\overrightarrow{rPZki} + \overrightarrow{GPTRi1} + [\overrightarrow{GPZi}]\} = \overrightarrow{PZki} \rightarrow PZ4k$ $\{\overrightarrow{rPSI1ki} + \overrightarrow{GPTRi2} + [\overrightarrow{PZki} \oplus \overrightarrow{GPZi2}]\} = \overrightarrow{PSI1ki} \rightarrow PSI1k$ $\{\overrightarrow{rgABAki} + \overrightarrow{GPTRi3} + [\overrightarrow{PZki} \oplus \overrightarrow{GPZi3}]\} = \overrightarrow{gABAki} \rightarrow gABAki$ $\overrightarrow{GPZi} = GPZ2i, \quad \overrightarrow{GPTRi} = GPZ1i$ $\{\overrightarrow{rgADAki} + \overrightarrow{GPTRi1} + [\overrightarrow{gABAki} \oplus \overrightarrow{PZki1}]\} = \overrightarrow{gADAki} \rightarrow gADAki$ $\{\overrightarrow{rgABIki} + \overrightarrow{GPTRi2} + [\overrightarrow{gADAki} \oplus \overrightarrow{PZki2}]\} = \overrightarrow{gABIki} \rightarrow gABIki$ $\{\overrightarrow{rgADIki} + \overrightarrow{GPTRi3} + [\overrightarrow{gABIki} \oplus \overrightarrow{PZki3}]\} = \overrightarrow{gADIki} \rightarrow gADIki$ $\{\overrightarrow{rPZ3ki} + \overrightarrow{GPTRi4} + [\overrightarrow{GPZi} \oplus \overrightarrow{PZki4}]\} = \overrightarrow{PZ3ki} \rightarrow PZ3k$ $\{\overrightarrow{rPSI2ki} + \overrightarrow{GPTRi5} + [\overrightarrow{PZ3ki} \oplus \overrightarrow{GPZi5}]\} = \overrightarrow{PSI2ki} \rightarrow PSI2k$ $$\overrightarrow{rdatum} = \overrightarrow{rdatum}^T \rightarrow \{\overrightarrow{rdatum} + \overrightarrow{TR} + [\overrightarrow{position\ vector 2}]\} = \overrightarrow{position\ vector 1}$$

$\overrightarrow{PZki} = PZ4k, \quad \overrightarrow{SPZTki} = SPZTki, \quad \overrightarrow{PTRki} = PZ3k$ (Equ.8-3)

$\{\overrightarrow{rFPDA2ki} + \overrightarrow{PTRki2} + [\overrightarrow{SPZTki} \oplus \overrightarrow{PZki2}]\} = \overrightarrow{FPDA2ki} \rightarrow FPDA2k$ $\{\overrightarrow{rFPDA3ki} + \overrightarrow{PTRki3} + [\overrightarrow{SPZTki} \oplus \overrightarrow{PZki3}]\} = \overrightarrow{FPDA3ki} \rightarrow FPDA3k$ $\{\overrightarrow{rFPDA4ki} + \overrightarrow{PTRki4} + [\overrightarrow{SPZTki} \oplus \overrightarrow{PZki4}]\} = \overrightarrow{FPDA4ki} \rightarrow FPDA4k$ $\{\overrightarrow{rFPDA5ki} + \overrightarrow{PTRki5} + [\overrightarrow{SPZTki} \oplus \overrightarrow{PZki5}]\} = \overrightarrow{FPDA5ki} \rightarrow FPDA5k$ $\{\overrightarrow{rFPDA6ki} + \overrightarrow{PTRki6} + [\overrightarrow{SPZTki} \oplus \overrightarrow{PZki6}]\} = \overrightarrow{FPDA6ki} \rightarrow FPDA6k$ $$\overrightarrow{rdatum} = \overrightarrow{rdatum}^T \rightarrow \{\overrightarrow{rdatum} + \overrightarrow{TR} + [\overrightarrow{position\ vector 2}]\} = \overrightarrow{position\ vector 1}$$

$\overrightarrow{PZki} = PZ3k \quad \overrightarrow{PTRki} = PZ4k, \overrightarrow{SPZki} = SPZ1ki$ (Equ.8-4)

$\{\overrightarrow{rPSI3ki} + \overrightarrow{PTRki1} + [\overrightarrow{PZki} \oplus \overrightarrow{SPZki1}]\} = \overrightarrow{PSI3ki} \rightarrow PSI3k$ $\{\overrightarrow{rPBjki} + \overrightarrow{PTRkij} + [\overrightarrow{PZki} \oplus \overrightarrow{SPZkij}]\} = \overrightarrow{PBjki} \rightarrow PBjki$ $$\overrightarrow{rdatum} = \overrightarrow{rdatum}^T \rightarrow \{\overrightarrow{rdatum} + \overrightarrow{TR} + [\overrightarrow{position\ vector 2}]\} = \overrightarrow{position\ vector 1}$$

$\overrightarrow{PZki} = PZ4k, \quad \overrightarrow{SPZTki} = SPZTki, \quad \overrightarrow{PTRki} = PZ3k$ (Equ.8-5)

$\{\overrightarrow{rFPDA7ki} + \overrightarrow{PTRki7} + [\overrightarrow{SPZTki} \oplus \overrightarrow{PZki7}]\} = \overrightarrow{FPDA7ki} \rightarrow FPDA7k$ $\{\overrightarrow{rFPDA8ki} + \overrightarrow{PTRki8} + [\overrightarrow{SPZTki} \oplus \overrightarrow{PZki8}]\} = \overrightarrow{FPDA8ki} \rightarrow FPDA8k$

Fig. 8B

Equations (Equ. 8-1) → calculations in global P2P transfer space GPRi
Dimension of the space: GPRxi + GPRyi + GPRzi = 1024 bits Equations (Equ. 8-2) → calculations in global P2P reference space GPBRi
Dimension of the space: GPBRxi + GPBRyi + GPBRzi = 128 bits Equations (Equ. 8-3) → calculations in separate P2P transfer space SPRki
Dimension of the space: SPRxki + SPRyki + SPRzki = 1024 bits Equations (Equ. 8-4) → calculations in separate P2P reference space SPBRki
Dimension of the space: SPBRxki + SPBRyki + SPBRzki = 128 bits Equations (Equ. 8-5) → calculations in separate P2P transfer space SPRki
Dimension of the space: SPRxki + SPRyki + SPRzki = 1024 bits

Fig. 9

Calculation of relative data element (datum) rPBj $$\{\overline{position\,vector1} - \overline{[position\,vector2]}\} - \overline{TR} = \overline{rdatum} \qquad \rightarrow \overline{rdatum}^T = \overline{rdatum}$$

$$\{\overline{PBjki} - [\overline{PZki} \oplus \overline{SPZkij}]\} - \overline{PTRkij} = \overline{rPBjki} \qquad \rightarrow rPBj$$

- Calculations carried out in separate P2P reference space SPBRki
  Dimension of the space SPBRki: SPBRxki+SPBRyki+SPBRzki=128 bits =ZUFL1

SPBRxki= 2 bytes
  SPBRyki= 50 bytes
  SPBRzki= 76 bytes

- Coordinate dimensions

ZUFL1= length of $\overline{PBjki}$ = length of $\overline{PZki}$ = dimension of SPBRki = 128 bits ZUFL2= length of $\overline{SPZKij}$ = 24 bits ZUFL3= length of $\overline{PTRkij}$ = 24 bits Calculation of position vector 2:
- Adaptation of the coordinate dimensions of $\overline{SPZKij}$ to $\overline{PZki}$
  (of ZUFL2 to ZUFL1)

SPZxkij= byte(3j-2) byte(3j-2),
SPZykij = $\underbrace{\text{byte (3j-1)... byte(3j-1)}}_{50}$,  SPZzkij = $\underbrace{\text{byte 3j .........byte3j}}_{76}$

- Adaptation of the coordinate dimensions of $\overline{PTRkij}$ (of ZUFL3 to ZUFL1)

PTRxkij = 0x00 byte (3j-2)
PTRykij = $\underbrace{\text{0x00...0x00 byte (3j-1)}}_{49}$,  PTRzkij = $\underbrace{\text{0x00......0x00 byte (3j)}}_{75}$,

Fig. 10

$$PZk = \{1st, ..., 16th\ byte\}$$

Generation of extended random number $$PZk_{extended} = \{\underbrace{1st, ..., 15th\ byte, 16th\ byte \oplus 1st\ byte}_{16th\ byte}, \underbrace{15st\ byte \oplus 2nd\ byte, ..., 16th\ byte \oplus 15th\ byte}_{17th\ byte}\}$$

Generation of position vectors $\overline{PZkj}^T$           (Equ.10-1)

$$PZk_{extended} = \{\underbrace{1st, 2nd, 3rd\ byte}_{}, ......\underbrace{..13th, 14th, 15th\ byte, 16th\ byte}_{}, ............\}$$

$$\overline{PZk}^T = \{\ \overline{PZk1}^T, ..................., \overline{PZk5}^T, ........................\}$$

Generation of translations/rotation vectors $\overline{PTRkj}^T$          (Equ.10-2)

$$PZk_{extended} = \{\underbrace{1st, 2nd, 3rd\ byte}_{}, ......\underbrace{.13th, 14th, 15th\ byte, 16th\ byte}_{}, ............\}$$

$$\overline{PTRk}^T = \{\ \overline{PTRk1}^T, ........\ ........\overline{PTRk5}^T, ........................\ .....\}$$

US 9,037,853 B2

COMMUNICATION METHOD FOR MULTISUBSCRIBER NETWORKS, WHICH IS PROTECTED FROM DECEPTION, EAVESDROPPING AND HACKING

CROSS REFERENCE TO RELATED APPLICATIONS

This application is a national stage filing under section 371 of International Application No. PCT/EP2008/065658 filed on Nov. 17, 2008, and published in German on Aug. 27, 2009 as WO 2009/103365 and claims priority of German application No. 10 2008 010 794.8 filed on Feb. 22, 2008, the entire disclosure of these applications being hereby incorporated herein by reference.

BACKGROUND ART

The present invention relates to a communication method in multi-subscriber networks wherein data are transmitted through wireless or wired transfer media from one point to another point in an unalterable, tap-proof, and non-hackable manner.

DE 100 43 313 discloses a method and an arrangement for fraud-resistant unambiguous positioning and identifying. The presented method relies on a plurality of reference spaces and reference space definitions. All reference spaces are arranged in a global space. The spatial positions of the reference spaces in the global space change at random times. Each transmitter and receiver determines its position and identity with reference to the reference spaces. The transmitter transmits at least one data element related to the determined positions to the designated receiver which calculates the position and identity of the transmitter in relation to the reference spaces from these data.

The method for unambiguous and fraud-resistant delivery of electronic data presented in DE 100 43 310 also relies on the theory of dynamically changing spaces. There is a global space, an identity space, identity points, encryption points, spatial reference points, and identity reference points. The transmitter and the receiver generate, from a multiplicity of definitions of spaces, reference surfaces, and reference points, information about the position of its identity points and information about an encrypting point. The transmitter generates a key, encrypts the data using that key, transforms the key in a space attributed to all of the keys, calculates the distance of the key space point from a reference point, transmits relative identity position data, the relative distance data element of the key, and the encrypted data to the designated receiver. The receiver determines the identities from the relative identity position data, and determines the key point in the space attributed to all of the keys from the relative key data element. The key is determined from the key point, and the encrypted data are decrypted therewith.

From DE 102 22 492 A1, another method is known that relies on the transmission of relative data in dynamically changing spaces. The method relates to safe, confidential and secret transfer of data allocated to a person, and of legal transaction data. In a high security trust center, secret random processes determine definitions about spaces and the spatial positions thereof, shifting vectors relevant for the method, reference points relevant for the method, independently from each other, which are transferred to all of the transmitters and receivers in form of relative data transmissions. Transmitters and receivers independently from each other generate a global space, a reference space, and an address space from the spatial definitions. The address space is completely within the reference space which in turn is a part of the global space. Since the spatial definitions are generated independently from each other, it may occur that a part of the reference space is beyond the global space. In case the reference space is beyond the global space, self repair of this spatial injury occurs by spatial shifting. The known solutions have the disadvantage that they require a multiplicity of central definitions about spaces and references points. Another disadvantage is that all of the P2P communications performed in a randomly determined time interval are performed within the same spaces and with the same reference points and shifting vectors in terms of the method.

BRIEF SUMMARY OF INVENTION

The object of the invention is to provide an unalterable and tap-proof point-to-point communication method in multi-subscriber networks which allows unalterable, tap-proof and non-hackable P2P communication based on a few central definitions.

BRIEF DESCRIPTION OF THE DRAWING FIGURES

FIG. 1 shows a portion of a multi-subscriber network;
FIG. 2 shows the contents of a global random reference data element;
FIG. 3 shows the contents of a separate random reference data element;
FIG. 4A illustrates method steps with reference to the data generated in the method;
FIG. 4B is a continuation of FIG. 4A;
FIG. 4C is a legend of FIGS. 4A and 4B;
FIG. 4D is a continuation of FIG. 4C;
FIG. 5 shows exemplarily a way for calculating all of the spatial coordinate data;
FIG. 6 shows an embodiment of mask operations;
FIG. 7A shows equations for calculating data;
FIG. 7B is a legend of FIG. 7A;
FIG. 7C is a continuation of FIG. 7B;
FIG. 8A shows equations for calculating data;
FIG. 8B is a legend of FIG. 8A;
FIG. 9 shows an example of adjusting the dimensions according to the invention;
FIG. 10 shows a way of extension; and
FIG. 11 illustrates a second exemplary application case.

DETAILED DESCIPTION

The invention is described with reference to exemplary embodiments illustrated in FIGS. 1-11. FIG. 1 shows a portion of a multi-subscriber network. As illustrated, the multi-subscriber network comprises a unit 1.1, a unit 1.2 and a wired transmission medium 1.3. Unit 1.1 is operable, according to the invention, as a transmitting unit. It is connected to transmission medium 1.3 via interface 1.11. Unit 1.2 is, according to the invention, the receiving unit. It is connected to transmission medium 1.3 via its interface 1.21. Transmission medium 1.3 is, in an exemplary embodiment, the internet. The inventive method relies on randomly determined global random reference data GZBDi which are valid for randomly determined time intervals $\Delta t_i$. All of the global random reference data GZBDi have a predefined length, a length of 2048 bits being advantageous. Besides the random reference data GZBDi, there are other data which each comprise at least one position data element (GODi—global position data element). Each random reference data element GZBDi has a position data element GODi or a plurality of position data GODiμ (position data element 3) associated therewith. Each position data element GODiμ is valid for a randomly predefined time interval $\Delta t_\mu$, wherein time interval $\Delta t_\mu$ is the same or not the same as time interval $\Delta t_i$. Position data element GODiμ comprises two bytes GOBiμ and Gobiμ. Byte GOBiμ indicates the byte position in random reference data element GZBDi, and byte Gobiμ indicates the bit position in byte GOBiμ. From bit position GODiμ in global random reference data element GZBDi on, a global random reference data element GZBiμ (partial random reference data element) is read. FIG. 2 shows the contents of global random reference data element GZBiμ.

With the position data GODiμ each comprising two bytes, a smaller number of global random reference data GZBDi becomes a larger number, which is advantageous in terms of storing.

According to the invention, random reference data GZBDi, position data GODiμ associated therewith, and validity time data (calendar data, global time) associated therewith are known to any unit involved in the method, hence units 1.1, 1.2 as well. They are unalterably and secretly (hidden) stored in the units, and are reloaded in form of relative data.

FIGS. 4 to 10 illustrate the principle of the method according to the invention with reference to the data generated in the method.

For a P2P communication, the transmitting unit 1.1 determines, for each P2P communication, a plurality of random numbers PZsk, at least one data element identifying a person and/or a unit, and/or at least one interlace data element, and/or at least one P2P control data element, and one component data element or a plurality of component data PBj. The presence of a component data element PBj is indicated by an activated bit associated with component data element PBj, in a component identification data element PBW. The continuation of the legend of FIG. 4 describes in detail the content of the component identification data element PBW. At least one component data element PBj is a permutation data element PI. Furthermore, transmitting unit 1.1 determines the P2P control information PSI (1-3) described in the legend of FIG. 4. This comprises determining position data, time settings, distance number, P2P control data, byte interlace data, key control data, permutation data PERM, data packet control data, and spatial data of separate spaces. Among the position data is position data element PODki (position data element 2). It indicates, analog to position data element GODiμ, the bit position in global random reference data element GZBDiμ, from which on the separate random reference data element SZBkiμ is read from the global random reference data element GZBDiμ, for a P2P communication k. FIG. 3 shows the contents of separate random reference data element SZBkiμ.

The transmitting unit 1.1 informs the receiving unit 1.2, by the P2P control word (PSW), whether the separate spaces are to be determined using control information PSI2 no. 5 from separate random reference data element SZBkiμ, or using control information PSI2 no. 6-8. The information bits provided therefore in the P2P control word may be controlled randomly or not randomly. The relations of equation 5-1 through equation 5-3 in FIG. 5 exemplarily show a way for calculating all of the spatial coordinate data.

The transmitting unit 1.1 sets any not randomly determined components of P2P control information PSI 1-3, generates a plurality of random numbers PZsk by means of a random generator thereof, not shown, and adds all of the randomly determined components to control information PSI 2-3, via logical mask operations. FIG. 6 exemplarily shows an embodiment of such mask operations.

The transmitting unit 1.1 determines, in conjunction with position data element SODkiμ (position data element 1) and the data identifying a person, a secret sender address data element gABAkiμ, a secret sender identity data element gABIkiμ, a secret recipient address data element gADAkiμ, and a secret recipient identity data element gADIkiμ. Letters k, i, and μ are indices which indicate the dependencies from the P2P communication and from random reference data GZBiμ and SZBkiμ. In the description below, index μ is dispensed with. This means, in terms of the method, that the randomly determined time intervals $\Delta t_i$ and $\Delta t_\mu$ are equal to each other.

Moreover, the component data are provided in function of the activated bits in the component identification data element.

With reference to global P2P reference space GPBRi, global references data GPZ1i, GPZ2i of global random reference data element GZBi, data identifying persons, random data PZk3, PZ4k, the following eight relative data are calculated using equations equ. 7-1 set forth in FIG. 7.

relative data element rPZ of random number PZ4k
relative data element rPSI1 of P2P control information PSI1k
relative data element rgABA of secret sender address data element gABAki
relative data element rgADA of secret recipient address data element gADAki,
relative data element rgABI of secret sender address data element gABIki
relative data element rgADI of secret recipient identity data element gADIki
relative data element rPZ3 of random number PZ3k
relative data element rPSI2 of P2P control information PSI2k.

With reference to separate P2P reference space SPBRki, separate reference data element SPZ1ki of separate random reference data element SZBki, random data PZ3k and PZ4k, relative data element rPSI3 of P2P control information PSI3k and each of relative data elements rPBj of component data element PBjk are calculated using equations equ. 7-2 set forth in FIG. 7.

FIG. 4 shows, at 4.1, the relative data of global P2P reference space GPBRi arranged sequentially, and at 4.2 the relative data of separate P2P reference space SPBRki arranged sequentially. Relative data 4.1 and 4.2 are sequentially arranged in a predefined known order. Each relative data element of 4.1 and 4.2 has a data length of DATL1. Preferably, DATL1 is 128 bits. Data length DATL1 results from the sum of the coordinate lengths of the spatial coordinates of the corresponding P2P reference space. The twenty relative data of 4.2 are padded in function of the sum of the coordinate lengths of the spatial coordinates of the corresponding transfer space GPRi and SPRki with further random numbers 4.3 to a multiple of the summed length of the transfer space. In this method step, random numbers 4.3 are considered as relative data. In the exemplary embodiments of the inventive method, the summed length of a transfer space is 1024 bits. The sequence of all the 128 bit relative data is divided into the two data blocks PDA-1 (4.4), and PDA-2 (4.5). For each data block, a hash value is determined, 4.41 and 4.51. As a simple hash value, the check sum of the data block is used. In function of interlacing control data 2 (PSI2 no. 2-4), parts of hash value 4.41 are interlaced into data block 4.4, wherein interlacing only starts following relative data 4.1. The interlaced data block 4.6 is packaged into P2P data blocks 4.7 having a data length of DATL2. Data length DATL2 corresponds to the summed length of the transfer space. The first P2P data block PDA1 of 4.7 includes the eight relative data of 4.1. The five other P2P data blocks FPDA 2-6 of 4.7 include a portion of the relative data of 4.2 interlaced with parts of the hash value. The second data block PDA-2 (4.5) is interlaced with parts of hash value 4.51 in function of PSI2 no. 2-4. The interlaced data block is packaged into further P2P data blocks 4.14 having a data length of DATL2. The two P2P data blocks FPDA 7, 8 comprise the remaining part of 4.2, and portion 4.3. With reference to global P2P transfer space GPRi, global reference data GPZTi, GPZ2i of global random reference data element GZBi, relative data element rPDA1 of P2P data block PDA1 is calculated using equation equ. 7-3 set forth in FIG. 7. With reference to separate P2P transfer space SPRki, separate reference data element SPZTki of separate random reference data element SZBki, random data PZ3$k$ and PZ4$k$, relative data rFPDA 2-8 of P2P data blocks FPDA 2-8 are calculated using equations equ. 7-4 set forth in FIG. 7. In function of the interlace control data 1 (corresponding to GDA1$i$ of GZBi in FIG. 2) which are identical for all units, the transmitting unit 1.1 interlaces partial data of relative data element rPDA1 of the first P2P data block into relative data rFPDA 2-6 of the other P2P data blocks of 4.8.

According to the invention, both interlacing operations (1 and 2) serve for obscuration. Thus, association of a part of the data with its relative data and the meaning thereof is prevented.

Transmitting unit 1.1 first transmits the interlaced P2P data blocks 4.9 as a P2P header 4.10. In presence of interlace data intended for the proper data, the proper data are interlaced with the interlace data using the control information PSI3 no. 2-4, wherein the interlaced proper data again are considered as proper data. The proper data are divided into data packets, for each data packet a hash value is calculated, and the hash value is added to the respective data packet. Each data packet with its hash value 4.11, or data with their hash values, are encrypted block-by-block, and/or are permuted, and/or are re-permuted, wherein the permutations and/or re-permutations are applied before and/or following encryption. Transmitting unit 1.1 determines, from all the preceding hash values, or from all the hash values, or from all the hash values of the data packets, a total hash value, and inserts at least one hash value indicator 4.12 (KHW) into the data stream, before the total hash value 4.13. Unit 1.1 encrypts and/or permutes and/or re-permutes both in conjunction with the most recent data packet supplemented with its hash value, or with the most recent data packets supplemented with their hash values. All of the encrypted, permuted data are transmitted. If a P2P data end block 4.16 is present, it is transmitted last. The data to be transmitted (P2P header; encrypted, permuted, and/or re-permuted data packets provided with hash values; encrypted, permuted, and/or re-permuted total hash value provided with KWH; P2P data end block) can be transmitted in a communication protocol dedicated for the method, or can be transmitted as data within a known communication protocol. Receiving unit 1.2 receives the P2P header, de-interlaces the data of relative data element rPDA1 from the relative data rFPDA 2-6 of the other P2P data blocks FPDA 2-6 using GDA1$i$ (interlace control data element 1), determines, from relative data element rPDA1, data element PDA1 using equation 8-1 of FIG. 8, and thus the concatenation of the relative data of 4.1 with data length DATL1. Random numbers PZ3$k$, PZ4$k$, P2P control information PSI1$k$, PSI2$k$, the data identifying a person, gABA, gADA, gABI, and gADI, are calculated using equation 8-2 of FIG. 8. From recipient address data gADA, GADI, the receiving unit 1.2 identifies itself as a unit authorized for reception. Thereupon, it determines the relative data rFPDA 2-6 from the remaining portion of the P2P header. Using equation 8-3 of FIG. 8, P2P data blocks FPDA 2-6 are calculated. Hash value 4.41 is de-interlaced from P2P data blocks FPDA 2-6. Receiving unit 1.2 calculates a hash value from PDA-1 and compares it with the received hash value 4.41. If there is a match, the receiving unit identifies the integrity of the relative data of the first data block 4.4.

From the remaining portion of the first data block, the remaining relative data rPSI3$ki$ and rPBjki are determined. P2P control data element PSI3$k$ and the first component data PBjk activated in the component identification data element are determined using equation 8-4 of FIG. 8. Among the component data is at least one permutation data element PIk. Using the permutation data and the key control data in P2P control information PSI3$k$, the encrypted and block-by-block permuted and/or re-permuted data packets provided with its hash values are decoded. Receiving unit 1.2 determines the hash value for each data packet, compares it with the received hash value, calculates the total hash value, detects the received total hash value 4.13 from hash value identity 4.12, compares the received total hash value with the calculated total hash value, and identifies the integrity of the data upon a match in all hash value comparisons. In presence of a P2P data end block 4.16, P2P data blocks FPDA 7, 8 (4.14) are calculated from relative data rFPDA 7, 8 (4.15), using equation 8-5 of FIG. 8. Hash value 4.51 is de-interlaced from the P2P data blocks. The receiving unit calculates the hash value of the data block from data block PDA-2, and compares it with the received hash value 4.51. Upon a match, the integrity of the relative data of data block PDA-2 is identified. From the concatenated relative data of the remaining component data, the remaining component data PBjk are determined using equation 8-4 of FIG. 8.

The legend of FIG. 7 illustrates the dimensions of the individual vectors used in equations equ. 7-1 through 7-4 (position vector 1, position vector 2, translation/rotation vector). It can be seen that individual vectors have different dimensions. Since the equations of FIGS. 7 and 8 only combine vectors having the same dimension, the dimensions are adjusted according to the invention. FIG. 9 shows an example of adjusting the dimensions according to the invention. As can be seen from FIGS. 7 and 8, according to the invention a separate reference data element (position vector 2) and a separate translation and rotation vector ($\overrightarrow{TR}$) are applied in each calculation of a relative data element. A transformation of all the separate references data and translation/rotation vectors would be inefficient. FIG. 10 shows a way of extension, applied in the method according to the invention, for obtaining sufficient separate reference data and translation/rotation vectors.

FIG. 11 illustrates a second exemplary application case. The figure shows a mobile device 11.1 having a touch screen 11.11, a second mobile device 11.2 having a touch screen 11.21, a first P2P communication 11.3 according to the invention, and a second P2P communication 11.4 according to the invention.

The invention claimed is:
1. A method for unalterable, tap-proof and non-hackable P2P communication in multi-subscriber networks wherein part of data are relative data calculated with reference to a space or a plurality of spaces, to a reference point or a plurality of reference points, comprising:
  performing each P2P communication with reference to at least one global random reference data element valid for a randomly defined time interval, and to a separate ran- dom reference data element and/or random data element valid for one P2P communication, storing at least said global random reference data valid for randomly defined time intervals secretly and unalterably in each P2P communication performing transmitting/receiving unit, wherein only units involved in a P2P communication have knowledge about the separate random reference data and/or random data valid for said P2P communication, determining at least a part of the separate random reference data and/or random data valid for said P2P communication in at least one unit involved in said P2P communication, and exchanging said at least a part in form of relative data between the units involved in said P2P communication, determining at least one exchanged relative data element of at least one random reference data element, and/or random data element, and/or data element identifying a person, and/or data element identifying a unit, and/or P2P control data element with reference to said currently valid global random reference data element, determining at least another exchanged relative data element or all of the other exchanged relative data with reference to said separate random reference data and/or random data valid for said P2P communication, and determining a relative data element by vector subtractions with a vector of a respective data element point as a minuend and a vector of a random reference point as a first subtrahend and a translation/rotation vector as a second subtrahend with reference to a space associated with a type of the relative data element, wherein:

a transmitting unit of a subscriber determines a plurality of random numbers, at least one data element identifying a person and/or a unit, and/or an interlace data element, and/or a P2P control data element, and a component data element or a plurality of component data, wherein presence of a component data element is indicated by an activated bit in a component identification data element associated with that component data element, at least one component data element is a permutation data element PI, the transmitting unit determines relative data having a data length DATL1 from the determined data, arranges said relative data in a predefined order into one data block or two data blocks or a plurality of data blocks, determines at least one hash value from said data blocks, interlaces partial data of each hash value into at least one predefined portion of the associated data block in function of interlace control data 2, packages the interlaced data into P2P data blocks having a data length of DATL2, and calculates relative data thereof, the transmitting unit uses all of the relative data of the P2P data blocks as data blocks of a P2P header, or uses a predefined number of relative data of the P2P data blocks as data blocks of the P2P header and the remaining rest as data blocks of a P2P data end block, the transmitting unit interlaces partial data of the relative data element of the first P2P data block into the relative data of the other P2P data blocks of the P2P header in function of interlace control data 1 which are identical for all units, first transmits said interlaced P2P data blocks as a P2P header, in presence of interlace data intended for proper data interlaces the proper data with the interlace data and continues to use it as proper data, and/or divides the proper data into data packets, generates a hash value for each data packet, adds the hash value to the respective data packet, encrypts and/or permutes and/or re-permutes a data packet with its hash value or data packets with its hash values, wherein said permutations and/or re-permutations are applied before and/or following encryption, the transmitting unit determines, from all the hash values or from all preceding hash values or from all the hash values of the data packets a total hash value, provides it with at least one flag, adds both to the proper data at the end of the proper data, and encodes and/or permutes and/or re-permutes in conjunction with the last data packet with its hash value added or the last data packets with their hash values added, if a P2P data end block is present, the transmitting unit transmits it last, a receiving unit receives the P2P header, de-interlaces the data of the relative data element of the first P2P data block from the relative data of the other P2P data blocks of the P2P header using said interlace control data 1, determines, from the relative data of the first P2P data block, the first part of the predefined sequence of relative data with a data length of DATL1 of the first data block, the receiving unit determines, from the relative data with a data length DATL1 of the first P2P data block, the random numbers, P2P control data, data identifying the data transmitting person and/or the data transmitting unit and the data receiving person and/or unit, identifies, from said identifying data, itself as an authorized recipient, thereupon determines the remaining part of the first data block interlaced with the partial data of its hash values from the remaining relative P2P data blocks of the P2P header, the receiving unit determines all the hash values by de-interlacing the partial data of the hash values from the first data block interlaced with the partial data of its hash values, calculates the hash value or the hash values over the de-interlaced data block, compares all the receiver and transmitter side hash values of the first data block with each other, in case of a match detects the integrity of the data of the first data block, the receiving unit determines, from the remaining portion of the predefined sequence of the first data block, the relative data with a data length of DATL1, and therefrom the first existing component data such as the permutation data element or permutation data PI, the receiving unit re-permutes and/or permutes and/or decrypts the encrypted and/or permuted and/or re-permuted data packets with its hash values added, wherein said re-permutations and/or permutations are applied before and/or following decryption, the receiving unit determines the hash value for each data packet, compares it with the received hash value, calculates the total hash value, identifies the received total hash value by the hash value indication or indications, and compares the received total hash value with the calculated total hash value, detects integrity of the data upon a match in all comparisons, the receiving unit, if a P2P data end block is present, determines the remaining P2P data blocks from the relative data with a data length of DATL2, de-interlaces the partial data of the hash value or hash values from the second data block interlaced with the partial data of its hash values, calculates the hash value or hash values over the second data block, compares all the receiver and transmitter side hash values of the second data block with each other, in case of a match detects the integrity of the data of the second data block, and the receiving unit determines the remaining component data provided from the predefined sequence of relative data of the second data block.

2. The method according to claim 1, wherein:

the relative data of the first portion of the first data block are determined in at least one space identical for all units, wherein the spatial data of each identical space are taken from a random reference data element identical for all units, all other relative data are determined within at least one separate space, wherein the spatial data are newly determined and defined for each separate space and for each P2P communication, by the transmitting unit, the separate spatial data are taken from the random reference data element known to all units involved in said P2P communication or from at least one random data element newly generated in the transmitting unit for each P2P communication, the transmitting unit generates, as control data, at least one position data element 1 related to the data element identifying a person and/or a unit, and/or a time data element of card transmission, and/or a time data element of P2P transmission and/or return transmission, and/or a distance number, and/or a P2P control word, and/or interlace control data 2 for the hash values of the data blocks, and/or interlace control data 3 for interlacing interlace data into the proper data, and/or data about the data packet length, and/or a position data element 2 and/or spatial data of separate spaces, and/or a key data element, and/or a key length data element, and/or key repetition data element, and/or a component identification data element, and/or a permutation data element PERM, said position data element 1 indicates the bit position of extraction of interlace data from the random reference data element identical for all units, wherein said interlace data serve for generating secret identifying data combined with a person and/or a unit, and/or said position data element 2 indicates the bit position of extraction of separate spatial coordinate values and/or separate references data, and/or said distance number, as an enumeration index with respect to a reference data element, informs about the most recent identical random reference data element existent and used by the unit, so that the receiving unit, upon a change-over to a new identical random reference data element, can select the random reference data element on which the communication is based, and/or said permutation data element PERM serves for permuting the permutation data PI, and/or one of the applied permutations is performed using permutation data PI, and the other permutation is performed using the permuted data of PI, and/or one of the permutations is bit permutation which is performed block-by-block, and/or encryption is performed with a random key, wherein at least a portion of the random key is included in the first data block in form of relative data, and/or the interlace control data 1 which are identical for all units are read from the random reference data element which is identical for all units, wherein the position of extraction of the interlace control data 1 is defined for a randomly predefined time interval by a position data element 3 which is known to all units.

3. The method according to claim 2, wherein:

said P2P control data are accommodated in more than one P2P control information of the length DATL1, and/or the random P2P control data in each P2P control information are generated using mask operations with reference to at least one random number, and/or one data element in each P2P control information has a duplicate, the receiving unit additionally detects the integrity of the data block from all of the duplicates, and/or the receiving unit detects, from said distance number and its duplicate, the validity of time data and of the identical random reference data element valid for all the units and for a time interval, and/or said interlace control data include at least one of an interlace start data element, a data element for identifying the data to be interlaced contiguously as data packets, and a data element for identifying data packet interlace spacings.

4. The method according to claim 2, wherein:

for a randomly determined time interval, at least one random reference data element is provided which is identically predefined for all units, wherein the length of the predefined random reference data element is the same or is larger than the total length of all identically predefined data reQiured for a P2P communication, if the length of the identically predefined random reference data element is larger, at least position data element 3 is provided which is valid for all the units and for a random time interval and indicates the bit position at which a partial random reference data element which is identical for all the units and has a length equal to the total length of all the identically predefined data reQiured for a P2P communication is read from the identically predefined random reference data element, said partial random reference data element identical for all units includes all of the identically predefined data reQiured for a P2P communication for all units and for the effective time interval, for a new effective time interval, a new partial random reference data element identical for all units is read from the longer random reference data element identically predefined for all the units and for a longer time interval, using a new position data element 3, only the units involved in said P2P communication have knowledge about the separate position data element 2 valid for said P2P communication, wherein said position data element 2 indicates the bit position at which a separate random reference data element having a length equal to the total length of all separate data reQiured for a P2P communication and predefined by the transmitting unit is read from the predefined random reference data element, and/or said separate random reference data element predefines at least a part of all separate data reQiured for a P2P communication.

5. The method according to claim 2, wherein:

said random reference point is a random number or random reference number interpreted as a vector, or a random data element related to another minuend and interpreted as a vector, and/or the vector of the respective data element point is determined by vector additions of the relative data element and the translation and rotation vector (second subtrahend) and of the vectors of the random reference point, and/or the respective absolute data element corresponds to the sequence of coordinate values of the respective vector, and/or said minuend is a data element point of random numbers, data identifying persons and/or units, P2P control information, and component data such as GPS data, and/or social security number, and/or tax number, and/or account number, and/or signatory data, and/or signature data, and/or device numbers, and/or card numbers, and/or identity numbers, and/or unit status data, and/or each relative data element relates to a separate random reference point and is calculated using a separate translation and rotation vector.

6. The method according to claim 5, wherein:

the calculations of the separate random reference points are exclusive or (XOR) combinations related to coordinates and performed bit-by-bit, between a random number interpreted as a vector or a random data element interpreted as a vector, of a length ZUFL1, and a random number of a length ZUFL2 interpreted as a vector, and/or between a random number interpreted as a vector or a random data element interpreted as a vector, of a length ZUFL2, and a random number of a length ZUFL3 interpreted as a vector, wherein the length of the random number or of the random data element is equal to the sum of the coordinate dimensions of the vector, the lengths of the random numbers and/or random data are the same or not the same with ZUFL1 larger than ZUFL2 and ZUFL2 larger than ZUFL3 and/or ZUFL3 equal three bytes, the dimensions of the coordinates of the vectors are determined by the spatial coordinate dimensions of the underlying space, in case of a smaller dimension of one coordinate of a vector compared to the dimension of the same coordinate of the other vector, the coordinate dimensions of both vectors are adjusted, and/or in each random data element comprised of a plurality of bytes, the Hamming distance between two consecutive bytes is one.

7. The method according to claim 6, wherein:

the respective vector of said minuend and/or said first subtrahend is the position vector thereof, and/or the minimal dimension of a spatial coordinate of an underlying space is one byte, and/or adjusting the coordinate dimensions of the vectors to be XOR combined bit-by-bit is performed with reference to the spatial coordinates of the space in which the relative data element is calculated, and in case of a smaller dimension of a vector coordinate, the coordinate value is repeatedly used in calculating the XOR combinations, or in case of a larger dimension of a vector coordinate, only that part of the vector coordinate overlapping the spatial coordinate of the space is used.

8. The method according to claim 5, wherein:

the coordinate dimensions of the translation and rotation vectors are determined or predetermined by the dimensions of the spatial coordinates of the underlying space, or are one byte each, in case of a larger dimension of one coordinate of the vector compared to the dimension of the same coordinate of the underlying space, only the dimension of the underlying space is used, in case of a smaller dimension of one coordinate of the vector compared to the dimension of the same coordinate of the underlying space, the value in the coordinate of the vector is padded with zeros until the dimension of the same coordinate of the underlying space is obtained.

9. The method according to claim 1, wherein:

in absence of a component data element, a random number of the same length is inserted in the respective data block instead of the relative component data element, or only the component data flagged in its component identification data element in conjunction with the activated bits associated therewith are arranged in a sequence in the respective data block in form of its relative data, wherein said data block is supplemented with random numbers of the same length as that of the component data.

10. The method according to claim 1 wherein:

the data stream comprised of the P2P header and the proper data which are encrypted and/or permuted and/or re-permuted and/or provided with hash values, or comprised of the P2P header and the proper data which are encrypted and/or permuted and/or re-permuted and/or provided with hash values and the P2P data end block, constitutes a dedicated communication protocol, or the data stream comprised of the P2P header and the proper data which are encrypted and/or permuted and/or re-permuted and/or provided with hash values, or comprised of the P2P header and the proper data which are encrypted and/or permuted and/or re-permuted and/or provided with hash values and the P2P data end block, are data of a communication protocol.

\* \* \* \* \*